United States Patent
Schlitz et al.

[15] 3,652,136
[45] Mar. 28, 1972

[54] ANTISKID BRAKE SYSTEM FOR VEHICLES

[72] Inventors: Erwin Schlitz, Heusenstamm; Werner Fink, Frankfurt am Main; Gunther Werner, Oberstedten, all of Germany

[73] Assignee: International Telephone and Telegraph Corporation, New York, N.Y.

[22] Filed: Jan. 12, 1970

[21] Appl. No.: 2,143

[30] Foreign Application Priority Data

Jan. 14, 1969 Germany .................. P 19 01 476.7

[52] U.S. Cl. ..................... 303/21 BE, 188/181 A, 303/20
[51] Int. Cl. ................................................. B60t 8/12
[58] Field of Search ............... 188/181; 303/21, 20; 307/112, 307/113, 121; 324/162; 328/71, 72; 340/262

[56] References Cited

UNITED STATES PATENTS

| | | |
|---|---|---|
| 3,532,393 | 10/1970 | Riordan ........................... 303/21 BE |
| 3,532,392 | 10/1970 | Scharlack ......................... 303/21 BE |
| 3,467,444 | 9/1969 | Leiber .............................. 303/21 BE |
| 3,494,670 | 2/1970 | Leiber .............................. 303/21 F |

Primary Examiner—Milton Buchler
Assistant Examiner—Stephen G. Kunin
Attorney—C. Cornell Remsen, Jr., Walter J. Baum and Paul W. Hemminger

[57] ABSTRACT

A vehicle antiskid brake system in which the brake pressure is reduced at one or more wheel deceleration thresholds and the brake pressure is increased when the maximum wheel acceleration is reached. Thus the brakes are reapplied before the wheel has reached the vehicle speed and at a time when the brake force coefficient is greatest. An electronic circuit closes an inlet valve and opens an outlet valve in the brake line to the wheel when the deceleration threshold is reached. Although the outlet valve is closed when the wheel deceleration is reduced to a point above the threshold, a timing circuit keeps the inlet valve closed until a differentiating circuit generates a signal indicating that the acceleration of the wheel has reached a maximum value, whereupon the inlet valve is opened to complete the cycle.

6 Claims, 4 Drawing Figures

ANTISKID BRAKE SYSTEM FOR VEHICLES

BACKGROUND OF THE INVENTION

1. Field of the Invention

This invention relates to a vehicle brake control system for preventing the wheels from locking when the brakes are applied and particularly a system of this type which is responsive to the rotary acceleration or deceleration of the wheel.

2. Description of Prior Art

Various antiskid systems using wheel deceleration thresholds as the signal for relieving brake pressure to prevent wheel locking have been proposed. A typical working cycle functions as follows: When the rotary deceleration threshold is exceeded, an inlet valve between the master cylinder and the wheel brake is closed while an outlet valve is simultaneously opened. When the deceleration falls below the threshold, the outlet valve closes while the inlet valve remains closed until either a predetermined time has elasped or until the wheel speed approaches the vehicle speed. Therefore, in each cycle the wheel speed either approaches or reaches the instantaneous speed of the vehicle. Referring to FIG. 2, which shows a typical brake force coefficient versus slip characteristic, it will be apparent that the working point moves from A toward B when the slip corresponding to the maximum friction value is exceeded due to excessive rotary deceleration. When the brake pressure is reduced, the wheel accelerates so that the working point moves to the left over the maximum point A toward zero and a new braking cycle is not initiated until the slip has almost reached zero. Since a certain amount of slip during the entire braking cycle is quite desirable, it is apparent that the stopping distance will be unnecessarily exceeded with these systems.

A control in which the wheel slip is maintained in the area of the maximum friction value of the curve is more desirable and would minimize the stopping distance. When the pressure in the brake circuit is reduced in order to avoid locking, the wheel is accelerated. This acceleration reaches its maximum when the brake force coefficient is at a maximum and therefore this is the best point to start a new braking cycle and prevent further reduction in the wheel slip.

In U.S. Pat. No. 3,467,444 a system is suggested which includes a brake pressure line for delivering brake fluid to the brake assembly of the wheel, a normally open inlet valve connected to the brake line for permitting the brake fluid to enter the line and a normally closed outlet valve connected to the line for permitting the braking fluid to escape from the line. The inlet and outlet valves are actuated by means, responsive to the condition of rotational deceleration of the wheel, which closes the inlet valve when the wheel exceeds a lower threshold of rotational deceleration and opens the outlet valve when the wheel exceeds an upper threshold of deceleration. As with the other systems mentioned, the suggested device allows the wheel to reach or approach the instantaneous vehicle speed during each cycle thereby unnecessarily increasing the stopping distance.

SUMMARY OF THE INVENTION

It is an object of this invention to provide an antilock brake control system in which the brakes are released at one or more deceleration thresholds and reapplied when the brake force coefficient between the tire and the road is near or at its maximum, thereby decreasing the stopping distance.

This object is achieved by reducing the brake pressure in the brake circuit in response to one or more deceleration thresholds and thereafter allowing the brake pressure to increase only when the maximum rate of acceleration is reached.

DESCRIPTION OF THE PREFERRED EMBODIMENT

The present invention utilizes a signal which is a function of the acceleration and deceleration of the wheel. This signal may be generated in a number of ways, one of which is by using a DC generator at the wheel to produce a rotational velocity signal which is differentiated to form the acceleration - deceleration signal. The signal is fed to an electronic switch and differentiating circuit. The electronic switch is connected through an amplifier to a pressure control element for isolating the wheel cylinder and through a second amplifier to another pressure control element for reducing the pressure at the wheel cylinder. The output signal from the switch is also used to initiate a timing circuit which will hold the first pressure control element in its actuated position. The output signal from the differentiating circuit is adapted to interrupt the timing circuit.

In the embodiment described, a single deceleration threshold is utilized to control the brakes. However, it will be apparent to those skilled in the art that the control system can be made dependent on several deceleration thresholds.

Figure 2:
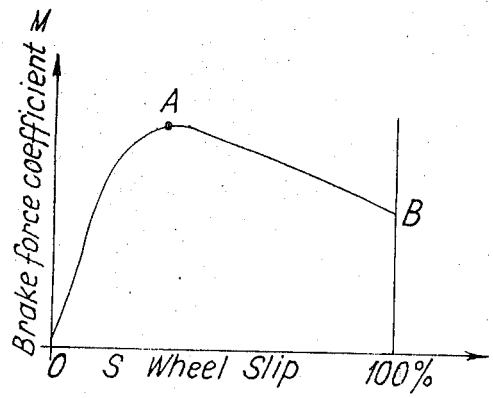
FIG. 2 is a typical brake force coefficient - wheel slip curve for a tire being braked on a surface having a high coefficient of friction.
Figure 3:
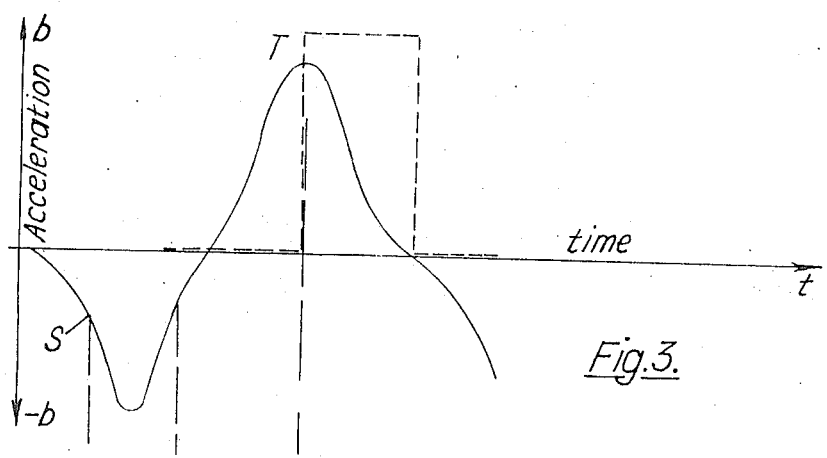
FIG. 3 is a curve of deceleration - acceleration against time for a wheel of the control system shown in FIG. 1.
Figure 4:
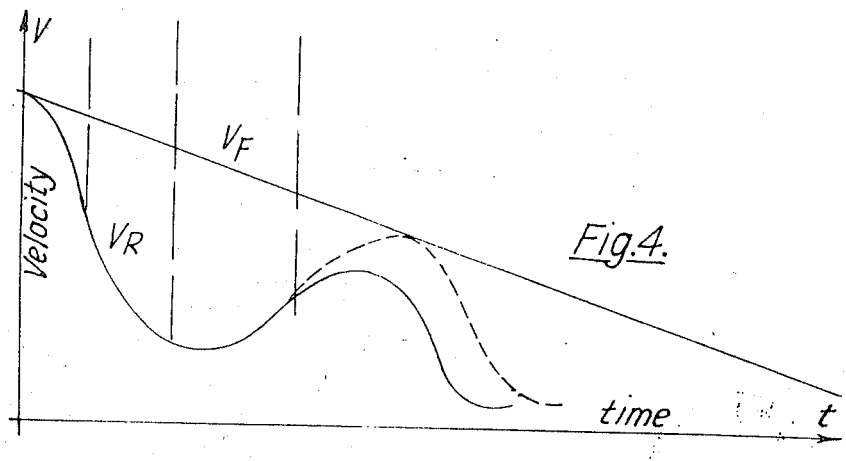
FIG. 4 is a curve of vehicle and wheel speed against time corresponding to the deceleration - acceleration curve of FIG. 3.

Referring particularly to FIGS. 3 and 4, the rotary wheel speed $V_R$ will rapidly decrease when the brakes are applied while the vehicle speed $V_F$ decreases, for the purposes of this explanation, at a relatively constant rate. When the rate of deceleration of the wheel approaches the deceleration threshold (S in FIG. 2), the electronic switch will be activated thereby generating a signal which closes an inlet valve and opens an outlet valve to the wheel cylinder so that the pressure in the wheel cylinder will decrease. Due to the response time built into the system, the rotary deceleration may continue to increase for a short time.

When the effect of the pressure decrease is felt at the wheel cylinder and the wheel deceleration is reduced until it is above the deceleration threshold, the electronic switch opens thereby closing the outlet valve. However, the inlet valve is held closed by a timing circuit which was activated by the initial closing of the electronic switch and therefore the pressure will not decrease any further. The wheel deceleration stops and the wheel begins to accelerate until it reaches its maximum acceleration at the point T of FIG. 2 corresponding to point A on the curve of FIG 1 where the brake force coefficient between the tire and the road is at a maximum. Unlike the prior art devices discussed above in which the inlet valve is not opened until the acceleration is negligible and the wheel speed has reached the vehicle speed, the inlet valve in this case will open at this point where the acceleration is at a maximum and the optimum friction conditions have been reached. This is accomplished by the differentiating circuit which generates a signal which cuts off the timing circuit thereby opening the inlet valve when the rate of acceleration has "peaked" at its highest point.

As the effect of the increase in brake pressure is again felt, the cycle will repeat as shown in FIG. 4. The dotted portion of FIG. 4 represents the curve which would be followed by the prior art devices.

Figure 1:
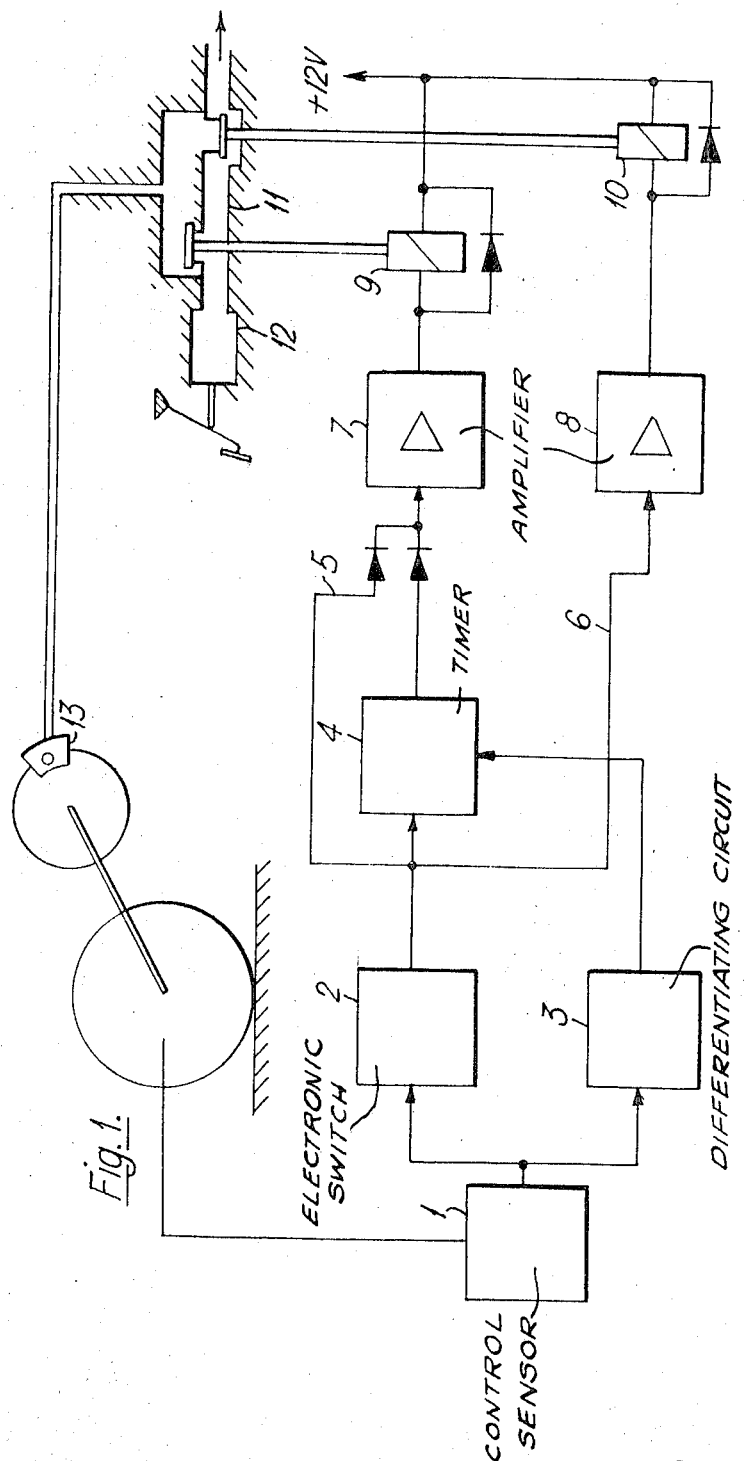
FIG. 1 is a schematic diagram of a brake system embodying the present invention.

Referring now to FIG. 1, which is a schematic of an electronically operated embodiment of this invention and which is representative for the control circuit provided for each of the wheels, a control sensor 1 gives off a signal which is a function of the rotary deceleration or acceleration. This signal is fed to the electronic switch 2 and differentiating circuit 3. The output signal from the electronic switch 2 initiates a timer 4 while the output signal from the differentiating circuit 3 deactivates the timing circuit 4. In addition, the output of the electronic switch 2 directly triggers the amplifiers 7 and 8 which operate the normally open inlet valve 9 and the normally closed outlet valve 10 which are located in the line 11 from the master cylinder 12 to the wheel brake 13.

When the brakes are applied and the deceleration signal from the sensor 1 reaches the activation level or deceleration threshold of the electronic switch 2, the circuit is closed feeding a signal to the timing circuit and the output amplifiers 7 and 8 thus closing the normally open inlet valve and opening the normally closed outlet valve thereby reducing the brake pressure to the wheel.

The wheel deceleration is reduced to a point above the threshold causing the electronic switch 2 to return to its initial position. The inlet valve is held closed by the timing circuit 4 while the outlet valve is closed. The wheel continues to accelerate and the differentiating circuit 3 provides a signal which is the differential of the acceleration signal produced by the sensor 1. When the rotary acceleration reaches a maximum value, the differentiating circuit 3 generates a signal and the timing circuit 4 is switched off thereby allowing the inlet valve to open to complete the control cycle.

In essence, the electronic circuit 3 is a differentiating circuit which gives off an output signal only when the maximum acceleration is reached. Since the acceleration is greatest when the brake force coefficient is at a maximum, the point at which the electronic circuit 3 generates the output signal corresponds to the point T in FIG. 2 and point A in FIG. 1.

Referring to FIG. 3, the dotted line shows the output of the differentiating circuit 3 and it will be seen that the output signal is generated at that point T where the acceleration has reached a maximum.

Although the embodiment shown utilizes a single deceleration threshold, a second deceleration threshold may be provided to prevent the pressure from becoming too high before the control cycle starts. In this embodiment the inlet valve would be closed when the first deceleration threshold is reached while the outlet valve would remain closed until the second and lower deceleration threshold is reached under constant brake pressure at which time the outlet valve will open. With this system, less hydraulic fluid is removed from the wheel cylinder to prevent locking of the wheel and the maximum value of acceleration is reached earlier. In this system, as in the embodiment shown, the inlet valve will be open and the outlet valve closed when the brake action begins. As the rotary deceleration reaches the first threshold, the inlet valve is closed and the outlet valve remains closed. Although the brake pressure will not be able to rise any higher, the deceleration continues due to the delay in the system and existing pressure until the second deceleration threshold is reached and the outlet valve opened. As the pressure is reduced, the wheel will begin to accelerate and the outlet valve will be closed when the first deceleration threshold is passed. As in the embodiment shown, the inlet valve remains closed through a timing circuit until the maximum acceleration is reached.

Although the embodiment shown utilizes an electronic circuit, it will be apparent that this could be accomplished either pneumatically or mechanically. The acceleration - deceleration signal may also be generated electrically, mechanically, hydraulically or pneumatically.

Although the terms deceleration signal and acceleration signal or the like are used herein, it will be understood that a single generator will produce a signal which is either an acceleration or a deceleration signal depending on whether the wheel is increasing or decreasing in angular velocity. Accordingly, the term acceleration should be understood to include deceleration when the sense in which it is used requires it.

It will be appreciated that the invention illustrated and described herein may be modified by those skilled in the art without deviating from the spirit and scope of the invention as set forth in the following claims.

We claim as our invention:

1. An anti-skid system for a vehicle having road wheels comprising:
    a wheel brake assembly associated with at least one of said wheels;
    first means coupled to said assembly for actuating said assembly;
    second means coupled to said one of said wheels to generate a single output signal which is proportional to the wheel acceleration;
    third means coupled to said second means to produce a first control signal when the deceleration becomes less than a given threshold value;
    fourth means coupled to said third means and said first means to couple said first control signal to said first means for interrupting the braking action of said assembly;
    fifth means coupled to said first means through said fourth means and directly connected to said third means, said fifth means being activated in response to only said first control signal to maintain the interruption of the braking action of said wheel assembly even when the wheel deceleration exceeds said given threshold value;
    sixth means directly connected to said second means responsive to said single output signal indicating a maximum wheel acceleration to produce a second control signal; and
    seventh means directly connected between said sixth means and said fifth means to couple said second control signal directly to said fifth means for deactivation thereof and thereby permit the braking action of said assembly.

2. A system according to claim 1, wherein said sixth means includes
    a differentiating circuit.

3. A system according to claim 1, wherein said third means, said fifth means and said sixth means are electronic circuits.

4. A system according to claim 1, wherein said first means includes
    a master cylinder,
    a normally open electromagnetic inlet valve disposed between said assembly and said master cylinder permitting communication therebetween, and
    a normally closed electromagnetic outlet valve coupled to said assembly.

5. A system according to claim 4, wherein said fourth means includes:
    a first amplifier coupled to said inlet valve and in common to the output of said third means and the output of said fifth means, and
    a second amplifier coupled between the output of said third means and said outlet valve.

6. A system according to claim 4, wherein
    said inlet valve responds to the presence of said first control signal to prevent communication between said master cylinder and said assembly and to the output signal of said fifth means until deactivated to continue the prevention of communication between said master cylinder and said assembly, and
    said outlet valve responds to the presence of said first control signal to open the outlet from said assembly and to the absence of said first control signal when the wheel deceleration becomes greater than said given threshold value to close the outlet from said assembly.

* * * * *